United States Patent
Ron et al.

(10) Patent No.: US 11,630,708 B2
(45) Date of Patent: Apr. 18, 2023

(54) OSN/PCS COLLABORATION MECHANISM INTEGRATION

(71) Applicant: Oracle International Corporation, Redwood Shores, CA (US)

(72) Inventors: Juan Allo Ron, Foster City, CA (US); Rajesh Tiwari, San Ramon, CA (US); Viswanathan Umapathy, Sarasota, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/583,165

(22) Filed: May 1, 2017

(65) Prior Publication Data

US 2018/0081505 A1  Mar. 22, 2018

Related U.S. Application Data

(60) Provisional application No. 62/395,873, filed on Sep. 16, 2016.

(51) Int. Cl.
*G06F 9/54* (2006.01)
*G06Q 10/101* (2023.01)
*G06Q 50/00* (2012.01)

(52) U.S. Cl.
CPC ............. *G06F 9/54* (2013.01); *G06Q 10/101* (2013.01); *G06Q 50/01* (2013.01)

(58) Field of Classification Search
CPC .................. G06F 9/54; G06Q 10/101
See application file for complete search history.

(56) References Cited

U.S. PATENT DOCUMENTS

| | | | |
|---|---|---|---|
| 5,956,715 | A | 9/1999 | Glasser et al. |
| 7,065,493 | B1 | 6/2006 | Homsi |
| 7,395,222 | B1 | 7/2008 | Sotos |
| 7,882,497 | B2 | 2/2011 | Nanivadekar |
| 9,594,602 | B1 | 3/2017 | Davidson et al. |
| 9,838,370 | B2 | 12/2017 | Doering et al. |
| 10,038,731 | B2 | 7/2018 | Pearl et al. |
| 10,320,887 | B2 | 6/2019 | Ron |

(Continued)

OTHER PUBLICATIONS

United States Patent and Trademark Office, Office Action dated Mar. 8, 2018 for U.S. Appl. No. 15/498,125, 9 Pages.

(Continued)

*Primary Examiner* — Howard Cortes
(74) *Attorney, Agent, or Firm* — Tucker Ellis LLP

(57) ABSTRACT

An example method facilitates collaborative participation in a process-based software application. The example method includes employing a process cloud integrated with a social network and document cloud to enable social network conversation-based collaboration during running of processes of the process-based software application. Hence, by integrating a social network with a process cloud, collaboration mechanisms can be created when a process starts. Process designers, i.e., process-based application designers or developers, may configure permissions for the various tasks in a process so that task participants can see some messages in the conversation but not all. As tasks are initiated and completed, automated messages may be posted to the conversation.

22 Claims, 7 Drawing Sheets

(56) References Cited

U.S. PATENT DOCUMENTS

| | | | |
|---|---|---|---|
| 10,514,910 | B2 | 12/2019 | Ron |
| 11,093,242 | B2 | 8/2021 | Ron |
| 11,169,823 | B2 | 11/2021 | Alabes |
| 2004/0078776 | A1 | 4/2004 | Moon et al. |
| 2004/0260702 | A1* | 12/2004 | Cragun .............. G06F 17/30873 |
| 2006/0174222 | A1* | 8/2006 | Thonse ...................... G06F 8/10 717/106 |
| 2010/0318649 | A1 | 12/2010 | Moore et al. |
| 2013/0018953 | A1* | 1/2013 | McConnell ............ G06Q 10/10 709/204 |
| 2014/0280377 | A1* | 9/2014 | Frew ..................... G06F 17/241 707/805 |
| 2014/0324513 | A1* | 10/2014 | Khalutin ............. H04M 3/5183 705/7.26 |
| 2014/0350997 | A1 | 11/2014 | Holm et al. |
| 2015/0067043 | A1* | 3/2015 | Agarwal ............... H04L 67/306 709/204 |
| 2015/0074642 | A1 | 3/2015 | Weatherhead et al. |
| 2015/0082148 | A1* | 3/2015 | Lai ........................ G06F 17/214 715/235 |
| 2015/0188927 | A1 | 7/2015 | Santhi |
| 2016/0202968 | A1 | 7/2016 | Ielceanu et al. |
| 2016/0321021 | A1 | 11/2016 | Derut |
| 2017/0052662 | A1 | 2/2017 | Smith, Jr. |
| 2017/0147296 | A1* | 5/2017 | Kumar ...................... G06F 8/34 |
| 2017/0200093 | A1* | 7/2017 | Motahari Nezhad ... G06F 40/30 |
| 2018/0074674 | A1 | 3/2018 | Alabes et al. |
| 2018/0081641 | A1 | 3/2018 | Ron et al. |
| 2018/0081994 | A1 | 3/2018 | Ron et al. |
| 2019/0253484 | A1 | 8/2019 | Ron |
| 2020/0065094 | A1 | 2/2020 | Ron |

OTHER PUBLICATIONS

United States Patent and Trademark Office, Office Action dated Oct. 9, 2018 for U.S. Appl. No. 15/440,866, 14 Pages.

United States Patent and Trademark Office, Office Action dated Nov. 19, 2018 for U.S. Appl. No. 15/498,125, 10 Pages.

United States Patent and Trademark Office, Office Action dated Mar. 8, 2018 for U.S. Appl. No. 15/589,929, 16 Pages.

United States Patent and Trademark Office, Notice of Allowance dated Feb. 7, 2018 for U.S. Appl. No. 15/498,125, 7 Pages.

Marini, et al., "Clowder: Open Source Data Management for Long Tail Data", PEARC 2018, Jul. 22-26, 2018, 8 pages.

Yuangui, "An Instance Mapping Ontology for the Semantic Web", Proceedings of the 3rd International Conference on Knowledge Capture, Oct. 2005, pp. 67-74, 8 pages.

United States Patent and Trademark Office, Notice of Allowance dated Aug. 30, 2019 for U.S. Appl. No. 15/589,929, 9 pages.

United States Patent and Trademark Office, Office Action dated Jan. 7, 2020 for U.S. Appl. No. 15/440,866, 18 pages.

United States Patent and Trademark Office, Office Action dated Jan. 6, 2021 for U.S. Appl. No. 15/440,866, 17 pages.

United States Patent and Trademark Office, Notice of Allowance dated Jul. 13, 2021 for U.S. Appl. No. 15/440,866, 9 pages.

United States Patent and Trademark Office, Office Action dated Jul. 9, 2020 for U.S. Appl. No. 15/440,866, 16 pages.

Oracle, "Oracle Social Network" Oracle Data Sheet, Oracle Cloud, Copyright © 2013, 3 pages.

United States Patent and Trademark Office, Notice of Allowance dated Feb. 7, 2019 or U.S. Appl. No. 15/98,125, 7 Pages.

United States Patent and Trademark Office, Office Action dated May 1, 2019 for U.S. Appl. No. 15/440,866, 18 Pages.

* cited by examiner

OSN/PCS COLLABORATION MECHANISM INTEGRATION

CROSS REFERENCES TO RELATED APPLICATIONS

This application claims priority from U.S. Provisional Patent Application Ser. No. 62/395,873, entitled OSN/PCS CONVERSATION INTEGRATION, filed on Sep. 16, 2016 (Trellis ref ORACP0169P), which is hereby incorporated by reference as if set forth in full in this application for all purposes.

This application is related to the following applications: U.S. Provisional Application Ser. No. 62/395,870, entitled DOCUMENT CLOUD SERVICES AND PROCESS CLOUD SERVICES MANAGED FOLDERS, filed on Sep. 16, 2016 (Trellis ref ORACP0168P), and U.S. Provisional Patent Application Ser. No. 62/395,913, entitled AUTOMATICALLY MAPPING DATA WHILE DESIGNING PROCESS FLOWS, filed on Sep. 16, 2016 (Trellis ref ORACP0170P), which are hereby incorporated by reference as if set forth in full in this application for all purposes.

BACKGROUND

The present application relates to computing, and more particularly to systems and methods for facilitating collaboration of participants interacting with a software-guided process, such as a business process of a process-based software application.

Software systems for facilitating collaboration are employed in various demanding applications, including enterprise social networks, collaborative webpage content development mechanisms (e.g., wikis), team management software, business-related approval tasks, and so on. Such applications often demand efficient mechanisms for guiding and focusing topics and associated user input to meet certain objectives, e.g., business objectives. Such applications may further demand process model implementation flexibility, including functionality for enhancing user awareness of process status, and so on.

Conventionally, software development environments and accompanying tools for implementing collaborative software applications are often only loosely controlled or guided toward particular topics. For example, enterprise personnel collaborating on a document or article may post comments to a blog linked to the article. However, such blogs often lack various mechanisms for enhancing or optimizing user awareness of process details and status. Accordingly, process participants or collaborators often lack complete context information that may be needed to make the most informed decisions when participating in a process.

SUMMARY

An example method facilitates collaborative participation in a process-based software application. The example method includes employing a process cloud to host a software application that is configured for use with a social network, wherein the process cloud is integrated with a document cloud and a social network; receiving a signal from the social network to run the software application; creating a social network conversation for each instance of the software application in accordance with one or more rules associated with the software application, wherein the one or more rules specify which participants of the social network shall be included in the social network conversation; using input from the social network conversation to affect or control progression of tasks of the software application; and maintaining the social network conversations and documents associated with the software application using the document cloud.

In a more specific embodiment, the step of creating a social network conversation further includes creating an intra-task level conversation. The intra-task level conversation represents a closed forum involving an exchange of communications between one or more participants. The intra-task level conversation may occur during an interval between adjacent tasks or processes of the software application.

The example method may further include automatically determining participants of the closed form based on a software task that has been completed or a software task that is to be completed, in combination with metadata characterizing the one or more participants. The metadata may include participant job role information and associated conversation role information, participant security credentials, etc.

In an alternative embodiment, creation of the inter-task level conversation may occur during an interval coinciding with the running of a given software task of the software application. The inter-task level conversation involves a subset of the participants that have been selected to participate in multiple collaborative tasks to be implemented via the software application.

Note that conventionally, mechanisms for efficiently leveraging or guiding conversations of collaborators to facilitate achieving detailed or complex objectives (which may involve sequences of tasks, which may include sub processes implemented in software, and which may or may not be responsive to human input) are lacking. Accordingly, process participants often lack insight into the progress of a process, and may have difficulty accessing email conversations between participants involved in implementing the process. Certain embodiments discussed herein address such shortcomings with conventional processes and associated implementation functionality.

Accordingly, certain embodiments discussed herein leverage integration between a social network and a process cloud and associated functionality and services. The integration allows different process stakeholders to have conversations while a software application (and accompanying process(es)) is running. This can substantially enhance software application and implementation flexibility, enabling additional use cases that can be leveraged during process modelling; enhancing user awareness of process status; and providing tools to enable clear communication channels between participants and the running processes of the software application.

Specialized User Interface (UI) display screens may be provided to enable authorized participants, e.g., administrators, to quickly update settings and permissions for social network conversations that will be initiated at runtime of the software application. By integrating a social network and process cloud and associated functionality as discussed herein, all stakeholders (e.g., task participants, customers, etc.) in a process can readily post to and access all conversations relevant to a particular process flow implemented by the software application.

A user or participant who starts the software application, e.g., via a form or message, may track and collaborate in the progress of the process(es) implemented via the software application through the associated social network conversation.

Hence, by integrating a social network with a process cloud, conversations can be created when a process starts. Process designers, i.e., process-based application designers or developers, may configure permissions for the various tasks in a process so that task participants can see some messages in the conversation but not all. As tasks are initiated and completed, automated messages may be posted to the conversation.

A further understanding of the nature and the advantages of particular embodiments disclosed herein may be realized by reference of the remaining portions of the specification and the attached drawings.

BRIEF DESCRIPTION OF THE DRAWINGS

FIG. 2 shows a first example User Interface (UI) display screen that may be presented on a participant system that is used by a participant of a conversation of the social network of FIG. 1.

DETAILED DESCRIPTION OF EMBODIMENTS

Figure 1:
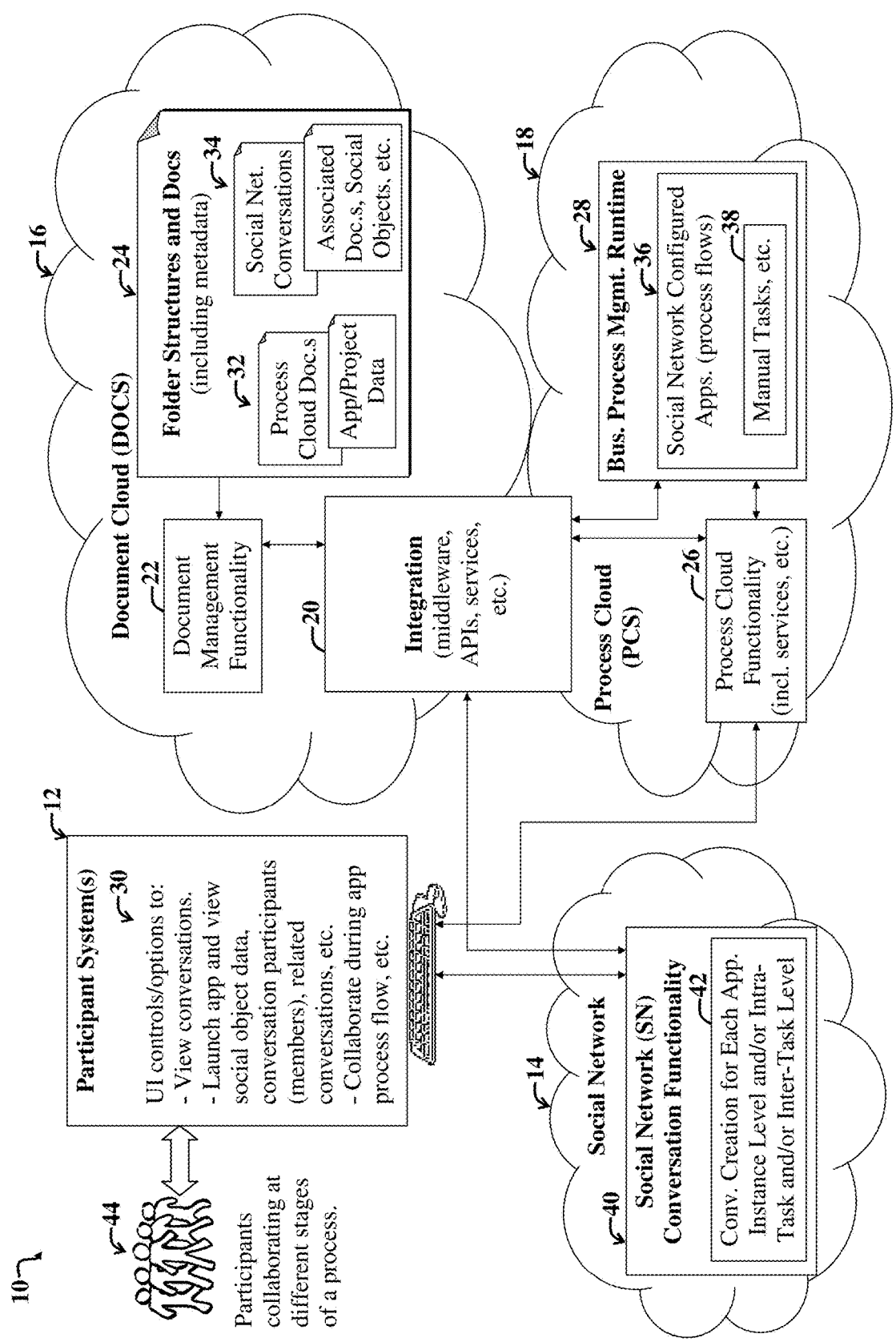
FIG. 1 is a first block diagram illustrating a first example system and accompanying computing environment enabling leveraging of functionality of a document cloud, process cloud, and social network to develop and run collaborative process-based software applications.

Conventionally, software developers may subscribe to certain cloud services to facilitate development of software applications and storage of associated files. A cloud service that is configured for software application or process flow development and/or implementation (i.e., for running developed processes) is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

However, conventionally, specialized PCS databases often lack certain features and functionality that may be particularly useful to developers and associated software applications and accompanying process flows.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called software activities. A sequence of steps of a process-based software application may be called a process flow. Process flows are often modeled and illustrated via swim lanes in a User Interface (UI) display screen. Process-based applications are often implemented via composite applications that may leverage different web services for different process steps.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment enabling leveraging of functionality of a document cloud 16, process cloud 18, and social network 14 to develop and implement collaborative process-based software applications.

For the purposes of the present discussion, software functionality may be any function, capability, or feature, e.g., stored or arranged data, that is provided via computer code, i.e., software. Generally, software functionality may be accessible via use of a user interface and accompanying user interface controls and features and underlying software applications. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 10 includes user computers, called participant systems 12 herein, which include browsers and accompanying UI display screens 30 and accompanying UI controls enabling participants 44 (also called collaborators herein) or a subset thereof to use and interact with a social network 14 and accompanying social network conversation functionality 40.

In the present example embodiment, the social network functionality 40 includes application-conversation computer code 42 for enabling social network conversations to be initiated for processes that may be run on the process cloud 18. The social network functionality 40 may include computer code for rendering one or more UI display screens and accompanying UI controls 30 (e.g., via a browser window running on participant client systems 12).

Example UI controls 30 for interacting with the social network functionality 40 include controls for providing user options to view conversations; launch applications and view associated social object data; view and interact with conversation participants (e.g., members of a conversation); view conversations related to a particular conversation or application process; collaborate during implementation of a process flow of a software application (e.g. application 36) that is configured for use with the social network 14, and so on.

The process cloud 18 includes process cloud functionality 26, which may include computer code for providing process cloud services to participant subscribers. The process cloud services and associated functionality 26 may include software application development functionality, e.g., enterprise software development environments and accompanying application designer tools.

The process cloud functionality 26 includes support for development of special process-based software applications that are configured to work with or otherwise receive input from or provide output to social network conversations 42.

The social network conversations 42 include social network conversations that are specifically instantiated by and used by business processes hosted and/or otherwise run by the process cloud 18 and associated business process management runtime engine 28.

The business process management runtime engine 28 includes code and associated functionality for running social-network configured software applications 36 and accompanying process flows, which may include various types of software tasks or activities, including manual tasks 38. For the purposes of the present discussion, a manual task may be any process that includes stages that require user input before transitioning to a subsequent stage or step.

The document cloud 16 includes document management functionality 22, such as code for enabling CRUD (Create, Read, Update, Delete) operations for folder structures 24 and accompanying folders and documents 32, 34. Additional example functionality includes code for enabling metadata services to provide rich descriptions of structures, folders, and documents 24. Such rich metadata may be leveraged by processes 36 of the process cloud 18. The process cloud 18 is integrated with the document cloud 16 via an integration system or module 20, which may include Application Programming Interfaces (APIs), services, and/or other middleware for integrating the document management functionality 22 of the document cloud 16; the process cloud functionality 26 and accompanying software applications 36 of the process cloud 18; and social network functionality 40 of the social network 14.

An example of an API that may be included in the integration module 20 includes a social network API that includes computer code for processing communications between the social network 14 and the process cloud functionality 26. The communications can include, for example, a signal from the process cloud 18 to the social network 14 to start a given social network conversation 42 for a particular social-network configured application 36, or alternatively, a signal from the social network 14 to the process cloud 18 to activate and run one or more social-network configured applications 36.

Participants 18 may employ the social network functionality 40 and accompanying UI display screen controls 30 to trigger a given application 36. When a particular social-network configured application 36 is instantiated, one or more specific conversations 42 for the application are created for the application and in accordance with instruction sets or rules of the application and accompanying processes and/or sub-processes.

The running processes and/or stored processes 36 may maintain files via the folder structures and documents 24 of the document cloud 16 and benefit from rich metadata afforded by the document management functionality 22. Examples of data that may be maintained via the document cloud 16 include process cloud documents and accompanying application and project data 32, and social network conversations and associated documents, e.g., social objects, etc. 34.

Hence, the example system 10 leverages integration between a social network 14 and a process cloud 18, which further leverages integration between the process cloud 18 and the document cloud 16 to facilitate allowing different process stakeholders to have conversations while a process is running. This can greatly enhance flexibility of software application features and enable software applications to efficiently accommodate additional use cases. Accordingly, process modeling functionality is greatly enhanced, allowing participants to remain keenly aware of process status, while additional software tools and functionality of the social network 40 facilitate providing clear communication channels and mechanisms between participants 18 of the social network 14.

Figure 2:
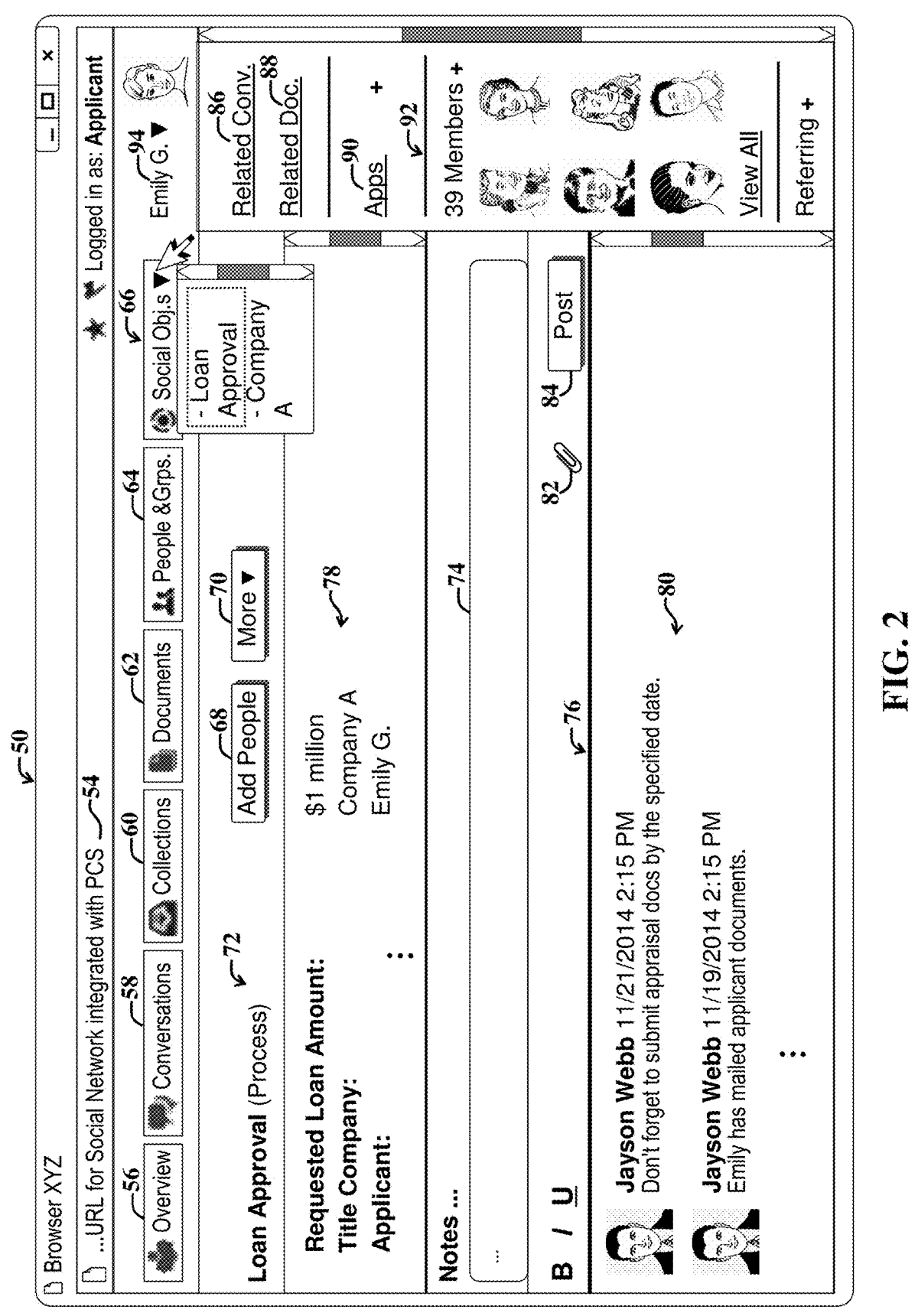

FIG. 2 shows a first example User Interface (UI) display screen 50 that may be presented on a participant system that is used by a participant of a conversation of the social network 14 of FIG. 1. Various UI controls and associated software functionality and content provided to a conversation participant, i.e., collaborator, via the example UI display screen 50, leverages conversation functionality 40 of the social network 14; process cloud functionality 26; functionality provided by the process-based software application 36 that is integrated with the social network 14; and document management functionality 22 and accompanying folder structures and documents 24 of FIG. 1.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The first example UI display screen 50 represents a browser window appearing after a collaborator (e.g., loan applicant) has browsed to a Uniform Resource Locator (URL) 54 for the social network 14 of FIG. 1 and has entered login credentials to login into the UI display screen 50, which represents a collaboration interface for facilitating implementing a process of a particular process-based software application (e.g., one of applications 36 of FIG. 1).

Note that, for the purposes of the present discussion, the term "conversation" may refer to a collaboration interface or mechanism, which may include underlying software functionality (also called collaboration framework or social network framework) instantiated for a particular collaboration pertaining to (or otherwise applicable) one or more associated process-based software applications. Similarly, a collaboration interface may be any collection of software mechanisms used to facilitate a content exchange (i.e., intercommunications) between participant systems.

Depending upon the context in which the term is used, a collaboration interface may also include the set of content (e.g., messages, documents, etc.) exchanged via the accompanying collaboration mechanisms. Accordingly, the UI display screen 50 and accompanying wall 76 may represent a collaboration interface for a "Loan Approval" social object for a process implemented using a process-based software application.

The first example UI display screen 50 includes four primary sections or features, and in particular, a conversation wall section (also simply called "wall" herein) 76, a social object content section (also simply referred to as the social object herein) 72 that depicts content 78 of a selected social object; a members section 92, which depicts representations of members, i.e., participants or collaborators associated with or collaborating on the social object 72; and a related-conversations control 86 for enabling a logged in participant 94 to view related conversations (which may include collections of messages, notes, document attachments, and so on) if the logged in participant 94 has permissions to view the related conversations (e.g., by virtue of permissions settings established for the login credentials used to log into the social network software identified by the URL 54).

For illustrative purposes, an additional related-documents control 88 and an applications control 90 are shown. The related-documents control 88 provides a user option to cause display of another UI display screen showing documents that may be related to or otherwise associated with the social object 72 and accompanying conversation 80. Similarly, the applications control 90 facilitates access to and use of other software applications and functionality that may augment capabilities of the UI display screen 50 and accompanying UI controls and features 56-92.

The social objects section 72 further includes a notes sub-section 74, whereby a user may enter and post notes (e.g., via a post control 84) and attach documents (e.g., via an attachment control 82), representations of which may appear among content 80 of the wall 76.

For the purposes of the present discussion, a conversation, e.g., represented via the wall content 80, may be a real time or near real time discussion and may include a title and a collection of one messages. The conversation can be private, public, or members only. Newly posted messages are appended to the existing list of messages 80.

For members only conversations, membership can change dynamically. A conversation can be optionally closed upon completion of an underlying process, e.g., as may be identified by an associated social object. Additional conversations can be forked (split while maintaining their relationship to the parent conversation) and/or related to or otherwise associated with a conversation.

A message of a conversation may contains a text and can be flagged to (also referred to as pinned on) a specific user, thereby enabling the user to take action and respond to the original message. Furthermore, replies can be posted to a message. Note that additional and/or different message functionality may be provided, without departing from the scope of the present teachings. For example, in certain embodiments, messages may include emoticons or other metadata characters, tags, flags, and so on.

The first example UI display screen 50 further includes a set of various example UI controls 56-66 for facilitating accessing content pertaining to a conversation associated with a particular process and/or process-based software application. The example UI controls 56-66 include an overview control 56 for displaying an overview of the conversation depicted via the UI display screen 50; a conversations control 58 for selecting different conversations or conversation subsets; a collections control 60 for accessing collections of conversations or related content; a documents control 62 for accessing various document-related functionality, e.g., browsing and viewing documents related to the subject conversation; a people and groups control 64 for viewing information pertaining to participants and/or groups of participants involved in the subject conversation; and a social objects control 66 for selecting from among one or more social objects that may define subject matter for the conversation or collaboration that the UI display screen 50 facilitates.

For the purposes of the present discussion, a social object may be any business object that contains or specifies a mapping of data from an available business application (e.g., one or more of the applications 36 of FIG. 1) or associated business process into a social network (e.g., the social network 14 of FIG. 1) and accompanying social network conversation functionality (e.g., the functionality 40 of FIG. 1). Generally, a social object may further include attributes (e.g., which may be stored as social object parameters) characterizing the social object.

In the present example embodiment, a social object is associated with a conversation that is represented on a wall of the social object. In particular, in first example UI display screen 50, the loan approval social object (selected via the social object control 66) is associated with a conversation 80 depicted on a conversation wall 76 of the UI display screen 50. Note that the conversation wall 76 can be updated, e.g., with one or more process-issued messages, to illustrate data changes in the underlying business application or process.

Accordingly, the participant has selected the social object entitled "Loan Approval" from a drop-down menu provided via the social objects control 66. In the present example embodiment, the "Loan Approval" represents a social object 72 for a loan approval process that is implemented by one or more of the software applications 36 of FIG. 1. An example loan approval process is represented by a process model that is discussed more fully below with reference to FIG. 3.

Note that a social network conversation, e.g., the conversation 80, may include various properties. Example properties include: name (conversation title), conversation description (for documentation purposes), auto join policy (e.g., none, manual, auto), enable default messages (upon user selection of an enable option), post messages when an assignee to a task or swimlane changes (enabling users to select an option to post a message to the conversation when an assignee changes, which can be particularly useful for tasks that are associated with plural assignees), and flag assignees (wherein if the post messages option is true and the join policy is auto, the user can check a flag-assignees option to ensure that assignees are flagged or otherwise identified or marked in the conversation when the task is assigned to them).

Note that nodes in a process (except boundary, gateways and abstract activity nodes) can trigger sending of a message upon entry and upon exit to the conversation. A developer or other authorized user that has logged into or otherwise has access to the process cloud functionality 26 of FIG. 1, can design the messages in the properties panel for a process flow, as discussed more fully below with reference to FIG. 4. Start and end events of a process flow may be treated as special cases. For example, start events may generate only entry messages, and end events may generate only exit messages.

Note that various embodiments that leverage process cloud and social network cloud integration can be particularly useful for use cases involving implementation of process flows that include manual tasks (e.g., signing and delivering a document), where task, where task participants may need to collaborate at different levels to get guidance, make decisions, and so on. Such collaborations can be enabled via social network conversations defined at different levels of granularity.

In summary, users employing UI display screens, such as the first example UI display screen 50, users will be able to selectively access conversations from a social network UI, e.g., where UI rendering instructions are provided to the participant systems 12 via the social network conversation functionality 40 of FIG. 1. In such social network UIs, users can view the social object associated with a process in which they are a participant; see process activity; completion milestone events, messages posted by other collaborators; and act on tasks (e.g., via a link or social object) from flagged messages.

Note that in certain implementations, a social network plugin may plugin to browsers running on participant systems 12. The plugin can be used to embed an UI in the workspace for tasks and/or process detail pages, to thereby facilitate viewing of corresponding conversations.

In the present example embodiment, when a social network configured project (e.g., process-based software application and associated process) is created, and if a social object identification and/or conversation identification is provided as input, then that input information is stored among the project data for subsequent reference in the process flow.

If social object or conversation identification information is not provided, then a new social object/conversation is created in the social network 14, and its identification (ID) is stored for subsequent reference. Processes and tasks may reference the ID. For cross-correlation purposes, the social object attributes are updated with the corresponding Ds of the associated process cloud objects (i.e., identifications of PCS process-based software applications and associated objects). Once a process is complete, the social object/conversation can be closed.

As modeled in a particular process implemented by a process-based software application (e.g., one of the applications 36 of FIG. 1), all configured social network interactions may executed by invoking corresponding social network REpresentational State Transfer (REST) APIs of the integration module 20 of FIG. 1.

The invocations themselves may be performed on behalf of the process by the configured administrative user. For a unified security model, end users who will be collaborating and posting messages will be added as members to the corresponding conversations programmatically via the social network APIs of the integration module 20 of FIG. 1, based on swimlane roles and/or process administration roles.

Note that in certain computing environments, a social network and a process cloud may not necessarily share common role definitions. In such cases, different users in the corresponding roles can be explicitly granted access. Accordingly, whenever application role memberships change (e.g., deletion and/or addition of roles), corresponding to swim lanes in processes, the corresponding social network conversation memberships are updated accordingly.

Note that, for resiliency to failures of the social network 14, a queuing mechanism (or alternative mechanism) can be used to ensure that operations of the social network 14 will eventually succeed after retries from the process cloud 18. UI display screens (e.g., the UI display screen 50 of FIG. 2) used to display social network content may be adapted to display an appropriate message in the event that communications between the process cloud 18 and social network 14 temporarily breakdown.

Figure 3:
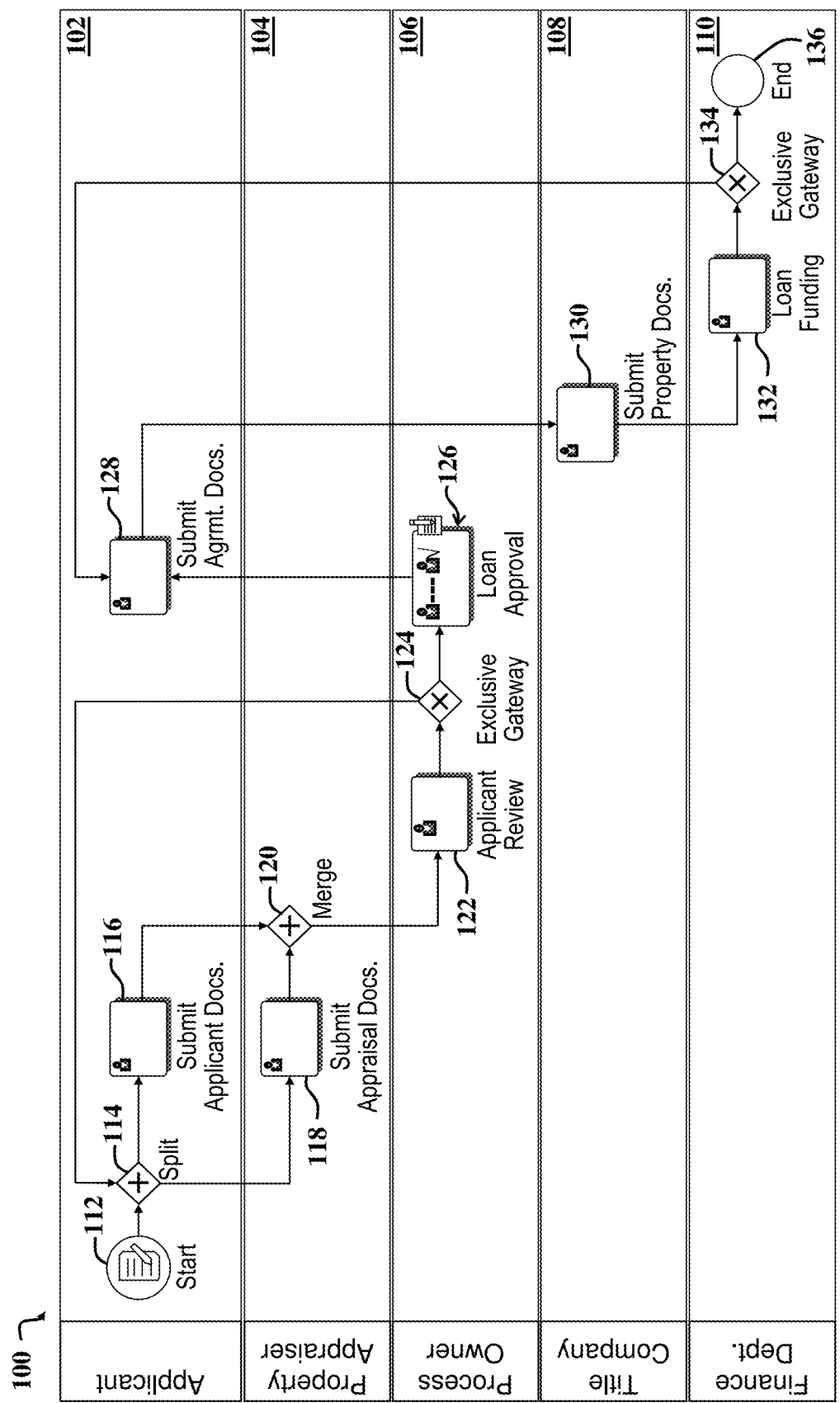
FIG. 3 illustrates an example process model for a loan approval process that may be implemented by or guided by a process-based software application that runs on the process cloud of FIG. 1 and leverages functionality of the social network that is integrated with the process cloud.

FIG. 3 illustrates an example process model 100 for a loan approval process that may be implemented by or guided by a process-based software application (e.g., one or more of the applications 36 of FIG. 1) that runs on the process cloud 18 of FIG. 1 and leverages functionality 40 of the social network 14 that is integrated with the process cloud 18.

The example process model 100 includes five swimlanes 102-110, wherein each swimlane 102-110 represents a collection of process elements, such as events (e.g., start and end events), activities, and gateways, that are to be performed by or are otherwise associated with a participant or collaborator involved in the process represented by the process model 100. For example, a first swimlane 102 includes one or more process steps 112-116, 128 allocated to an applicant; the second swim lane 104 includes one or more process steps 118, 120 allocated to a property appraiser; the third swim lane 106 includes one or more process steps 122-126 allocated to a process owner (e.g., loan processing agent); a fourth swimlane 108 includes one or more process steps 130 allocated to a title company; and a fifth swimlane 110 includes one or more process steps 132-136 allocated to a finance department (e.g., a finance department of a bank).

For the purposes of the present discussion, a gateway may be any step or point in a process flow, e.g., as may be illustrated by a BPMN process model, which involves a merging and/or joining of paths in a process flow. For example, an outcome of a gateway step may result in selection of a subsequent step from among plural possible steps, wherein the selection is based upon the outcome. Hence, as represented in a BPMN process model, a gateway may be used to represents a branching step in the process model, past which more than one possible paths or sequences of process steps are possible.

Accordingly, a gateway condition may be any criterion or criteria used to determine the outcome of the gateway step, thereby resulting in selection of one or more of the plural output paths (also called outbound paths) in accordance with an outcome of the gateway step, the outcome resulting from evaluation of the criterion or criteria with reference to an input signal or data (as input to the gateway step in the process).

At each process step 112-136, an underlying process-based software application (e.g., one or more of the applications 36 of FIG. 1) may present one or more UI display screens to the participants to facilitate implementation of tasks that are assigned thereto or to be performed thereby. For example, in the first swimlane 102, the applicant is tasked with submitting a loan application (applicant documents) at the submittal activity 116. Accordingly, the underlying software application used to facilitate implementing the process represented by the process model 100 may present one or more UI display screens to facilitate submittal of a loan application, which will then (after the property appraiser has submitted appraisal documents during an appraisal submittal activity 118) be accessible by the process owner, who handles the third swim lane 106.

Note that during implementation of the process depicted by the process model 100, the participants associated with the swimlanes 102-110, may collaborate and have conversations pertaining to the state of the underlying process, due in part to integration of the underlying process-based software application (e.g., application 36 of FIG. 1) with social network conversation functionality 40 of FIG. 1. An example UI display screen that may facilitate such collaboration is shown in FIG. 2.

Note that in the present example embodiment, by default, an application level conversation will be created for each application instance. The application instance level conversation will provide a forum where process participants across tasks will be able to collaborate. For example, in the process flow depicted by the process model 100 in FIG. 3, a finance officer (in charge of the fifth swimlane 110) performing a loan funding activity 132 can converse with a loan agent (e.g., handling the third swim lane 106) regarding the documents submitted by the loan applicant (handling the first swim lane 102).

Additional conversations can be used for intra-task level and inter-task level collaboration. These will not necessarily be started automatically, but users can choose to start such conversations on demand when needed from the UI provided by the underlying software application. Appropriate participants can then be invited to be members of those conversations.

An intra-task level conversation may provide a closed forum where, for example, the loan agent (e.g., task participant handling the third swim lane 106) can consult some authority within the bank (associated with the fifth swimlane 110) regarding applicant creditworthiness and/or risk, e.g., so as to help make an approval decision on the loan.

An inter-task level conversation may facilitate collaboration among a subset of the participants corresponding to multiple tasks to collaborate. The difference between an inter-task level conversation and an application-instance level conversation is that only a strategically selected set of participants will be invited to the conversation, thereby enabling more privacy for discussing issues that are preferably not seen by all participants of a process.

While the present example embodiment has been discussed with respect to a loan approval process, embodiments are not limited thereto. Various additional example use cases are described in the table below.

TABLE 1

| Type of Interaction | Pattern | Sample Use Case |
|---|---|---|
| Routine Process Collaboration | Internal collaboration between process/task participants and expert in company | Determining promotions/rebates to offer to customers who are unhappy from survey or who have not shopped in a while |
| | Internal collaboration between process/task participants | Determining discount/non-standard terms for Sales Quote<br>Determining schedule/cost/contract terms for an RFP |
| | External collaboration between process/task participants and consultants/agencies | Handling insurance claims/investigating fraud |
| | Private collaboration between specific process participant and specific functional role in company | Resolving HR grievance in any of the HR processes (interview, on boarding) |
| Ad Hoc Collaboration | Unplanned collaboration between process/task participant and domain/service specialist in company. The social object will be the context object. | Help while filling a Loan Application Form. The social object will be the form being filled by the user.<br>Help while performing task data update or approval. The social object will be the task (current data held by the task, comments, attachments, history) being acted upon by the task assignee. |
| Activity Stream | System generated event indicating achievement of milestones | In SaaS application process extension use cases, application stakeholders can get alerts on approval progress<br>Task assignees will get alerted for items they need to start investigating/planning based on completion of prior events<br>Customer service teams can monitor progress of their customers as appropriate messages are posted from processes handling those requests |
| | System generated event alerting users to take immediate | Escalated request (urgent customer travel) needs to be acted on right away (to be approved)<br>Adverse action requiring immediate |

TABLE 1-continued

| Type of Interaction | Pattern | Sample Use Case |
|---|---|---|
| | action | action (High value customer rejecting sales quote, update to an external order system failed) can be handled in a timely manner<br>Approval pending beyond a certain threshold (person on vacation/moved out) can be acted upon immediately thereby avoiding delays |

Figure 4:
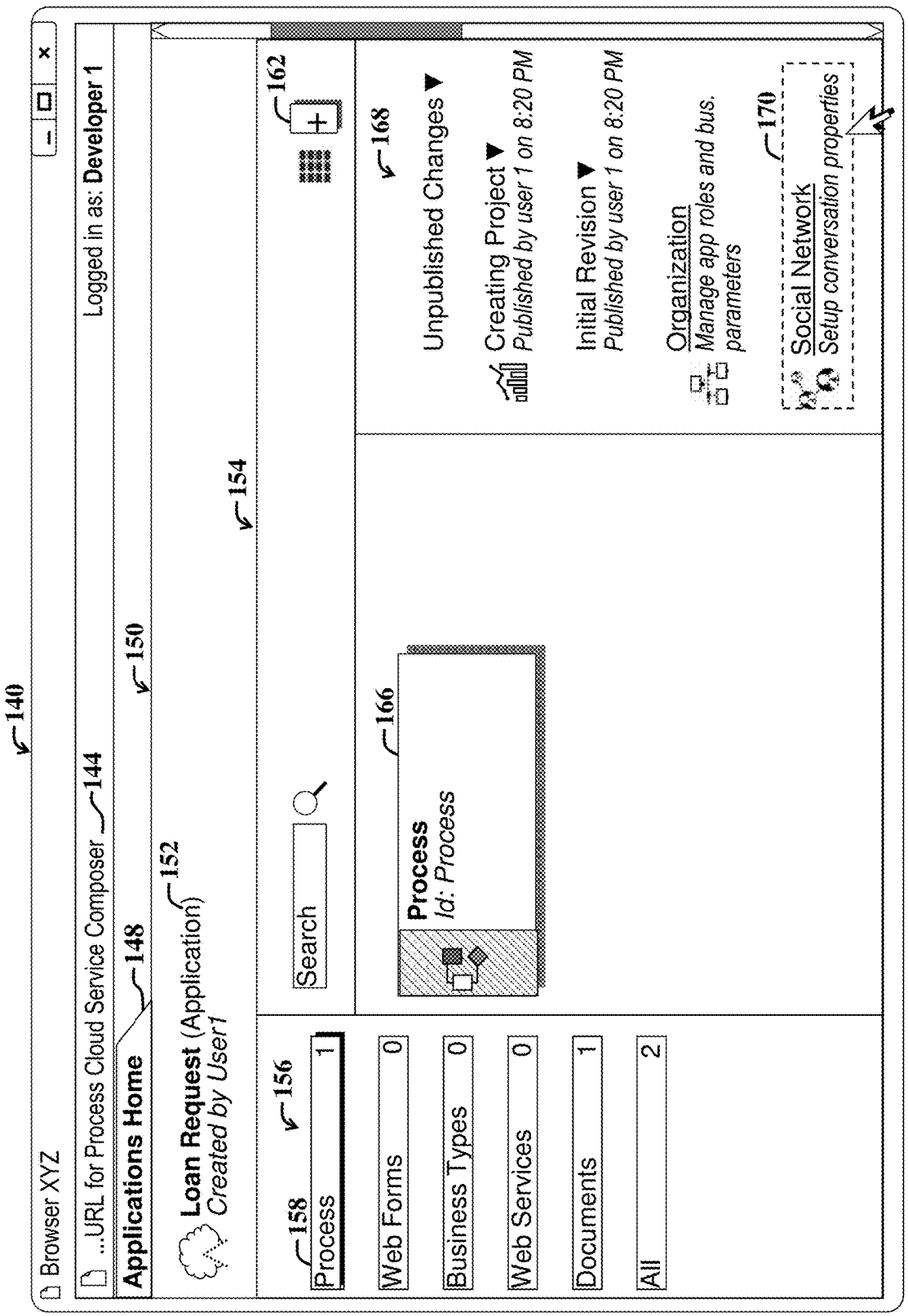
FIG. 4 illustrates a second example UI display screen that may be presented on a participant system that is used by a software application developer or other authorized user to configure process settings and conversation settings for a process of a software application via one or more UI controls in an application home page.

FIG. 4 illustrates a second example UI display screen 140 that may be presented on a participant system (e.g., one of the participant systems 12 of FIG. 1) that is used by a software application designer or developer and/or other authorized user, for configuring process settings and conversation settings for a process of a software application (e.g., one or more of the software applications 36 of FIG. 1) via one or more UI controls 152-170 in an application home page 150 (as indicated by an "Applications Home" label 148).

The second example UI display screen 140 represents a UI display screen for a PCS composer application that is included among the process cloud functionality 26 of the process cloud 18 of FIG. 1. The underlying PCS composer application may be accessed by a browser running on one of the participant systems (also called client systems) 12 of FIG. 1, which is used to browse to a URL 144 for the PCS composer application and thereafter provide login credentials to log into the PCS composer application used to generate the second example UI display screen 140.

In the applications home section 150, currently, information and UI controls applicable to a loan request application 148 are displayed. In the present example embodiment, various UI controls 156 may act as tabs, where user selection of the different controls 156 result in a change in the information displayed to the right of the controls 156. For example, a process control 158 is selected, resulting in display of a process tile 166 to the right thereof. A plus button 162 may facilitate adding and configuring additional processes to be used with the identified loan request application 152.

Accordingly, the information displayed in the applications home tab section 150 includes information about a constituent process, which is displayed, in part, in the process tile 166. The process tile 166 may also act as a UI control, such that upon user selection thereof, another process tap may appear adjacent to the applications home 148 tab. Note that access to UI controls of a process tab may be arrived at in a different manner, without departing from the scope of the present teachings.

The resulting process tab may provide various user options to specify properties, e.g., to design messages to be sent to an associated social network conversation upon entry and exit of a given process step. UI controls for specifying auto join policies; for flagging assignees, and so on, may also be provided.

User selection of a social network properties control 170 (which is included among various additional controls 168, e.g., for facilitating viewing unpublished changes; creating projects; accessing application role settings and parameters, and so on) may result in display of one or more additional dialog boxes with additional settings. Example settings that may be adjustable via the additional settings include conversation name, conversation description, conversation join policy, whether or not to enable automatic posting of default messages to the conversation, whether or not to post task assignment messages, whether or not to flag assignees for a process in an associated conversation, and so on.

In summary, the second example UI display screen 140 enables a user, e.g., developer, to quickly update the settings and permissions for social network conversations that will be used at runtime of an associated process-based software application.

Integration of the process cloud 18 and the social network 14 of FIG. 1 enables enable all stakeholders in a process (e.g., task participants) to be able to post and access relevant conversations. A user who starts the process (e.g., using a form or a message to start the process), can track and collaborate in the progress of that process through the conversation.

In the present example embodiment, if integration with the social network 14 of FIG. 1 is enabled in the process cloud 18, a conversation may be created when a process starts. Process designers will be able to selectively configure permissions for the various tasks in a process so that task participants can see some messages in the conversation but not all. As tasks are initiated and completed, automated messages may be posted to the conversation.

Note that this provides a substantial advantage over conventional process-based applications running on a process cloud, where participants often lack insight into the progress of a process, and where email conversations between participants may not be kept with or organized in accordance with the corresponding process.

Figure 5:
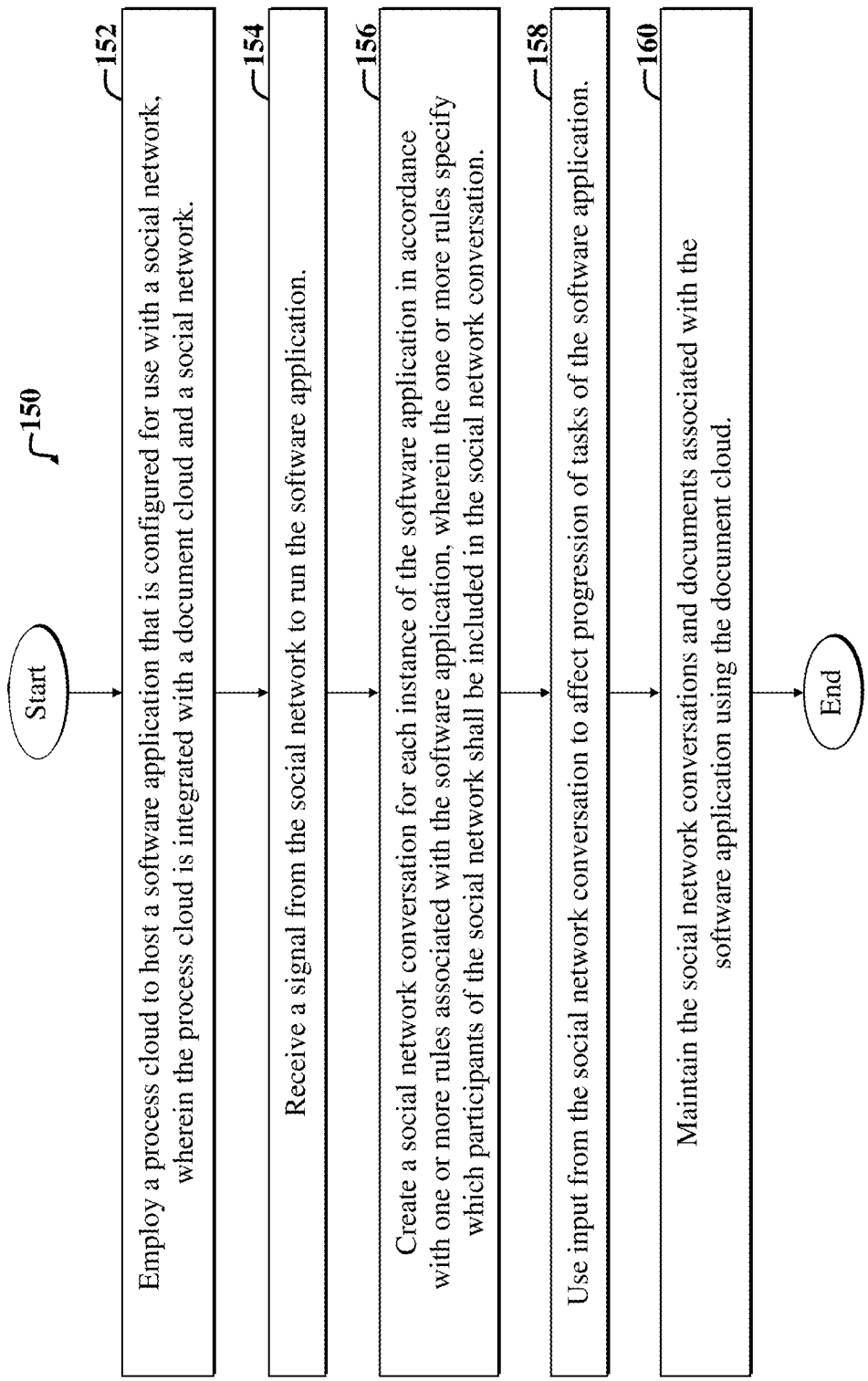
FIG. 5 is a flow diagram of an example method implementable via the embodiment of FIG. 1.

FIG. 5 is a flow diagram of an example method 150 implementable via the embodiment of FIG. 1. The example method 150 facilitates collaborative participation by users of a social network in one or more processes of a process-based software application.

The example method 150 includes a first step 152, which involves employing a process cloud (e.g., the process cloud 18 of FIG. 1) to host a software application (e.g., one of the software applications 36 of FIG. 1) that is configured for use with a social network (e.g., the social network 14 of FIG. 1). For the purposes of the present discussion, a software application is said to be hosted by a process cloud if functionality of the process cloud is employed to facilitate development and/or deployment and running (and/or triggering deployment and running) of a software application. The process cloud is integrated with a document cloud and a social network, e.g., via one or more APIs, services, and/or other middleware or integration technologies.

A second step 154 includes receiving a signal from the social network to run the software application. With reference to FIGS. 1 and 2, one of the participants 18 or prospective participants of the social network 14 may employ one or more UI controls 30 to launch one or more process-based software applications 36 that have been configured to operate with the social network 14 and data and functionality 40 thereof.

The signal may be sent from the participant systems 12 to the social network functionality 40, which may then route the signal to the process cloud, e.g., via a social network API of the integration system 20, to activate, run, or and/or otherwise participate in a process of one or more software applications of the process cloud 18. Note that the second step 154 is merely an example, and that process-based software applications may be started via mechanisms other than signals from a social network, without departing from the scope of the present teachings.

A third step 156 includes employing the social network functionality 40 and code or instructions of one or more software applications 36 to create a social network conversation for each software application instance in accordance with one or more rules associated with the software application being run. The one or more rules may specify, for example, which participants of the social network shall be included in the social network conversation.

A fourth step 158 includes using input from the social network conversation to affect or control progression of tasks of the software application. The way conversational or collaborative input affects a given process of a software application is implementation specific and may vary depending upon the needs of a given implementation and instructions for sequencing and controlling processes and sub-processes of the software application. A sequence of processes, sub-processes, and/or associated software tasks or activities may be modeled using swim lanes.

A fifth step 60 includes maintaining the social network conversations and documents associated with the software application using the document cloud, e.g., via the folder structures and documents 24 of FIG. 1. Accordingly, the integration system or module 20 of FIG. 1 may include APIs and other interfaces as needed to integrate the process cloud 18 and associated functionality 26 with not just the social network 14 and associated social network functionality 40, but the document cloud 16 and associated document management functionality and associated services 22, which may include rich metadata services.

The example method 150 may be altered, without departing from the scope of the present teachings. For example, the method 150 may further specify that the third step 156 involving creation of a social network conversation further includes an intra-task level conversation.

The intra-task level conversation may represent a closed forum involving an exchange of communications between one or more participants. The intra-task level conversation may occur between adjacent tasks or processes of the software application.

The method 150 may further include automatically determining participants of the closed form based on a software task that has been completed or a software task that is to be completed, in combination with metadata characterizing the one or more participants. The metadata may include, for example, participant job role information, security credentials (e.g., content access permissions), specific conversation membership permissions, special administrator-assigned privileges for a particular software application, etc.

The method 150 may further include includes creating an inter-task level conversation occurring during running of a given software task. The inter-task level conversation may involve a subset of the participants that have been selected for participation in multiple collaborative tasks to be implemented via the software application.

Exact mechanisms for selecting participants are implementation specific and may vary, without departing from the scope of the present teachings. For example, in certain implementations, a software application may automatically select participants of a social network, whereas in other implementations, an administrator or other user may be prompted to specifically invite participants or groups of participants to collaborate during running of a given process or processes of a software application.

Accordingly, the method 150 may further include determining the participants, such that an application-level conversation will include participants that have been invited to the conversation in accordance with one or more rules specified via the software application.

Participants may be selectively excluded or included based on a particular task or sub-task or process being implemented via the software application. Alternatively or in addition, participants may be selected such that an application-level conversation will include participants that have been invited to the conversation in accordance with one or more rules specified via an administrator.

Alternatively, or in addition, participants may be programmatically selected and added to a conversation, where the selected participants are to collaborate during one or more processes of the software application using one or more Application Programming Interfaces (APIs) used to integrate the social network with the process cloud and further based on one or more process swim lane roles or process administration roles.

Furthermore, note that certain participants at certain times during a process flow of a running software application may be included and/or excluded from a conversation pertaining to the software application. Such exclusion or inclusion can be performed programmatically and/or by an administrator or other authorized user that explicitly grants participant access to the social network conversation. Selection criteria may be based on participant role information, such that when a change to role information is detected or determined (e.g., where the exclusion and/or inclusion may affect a swim lane of a process), a corresponding social network conversation membership can be updated to reflect the change.

Figure 6:
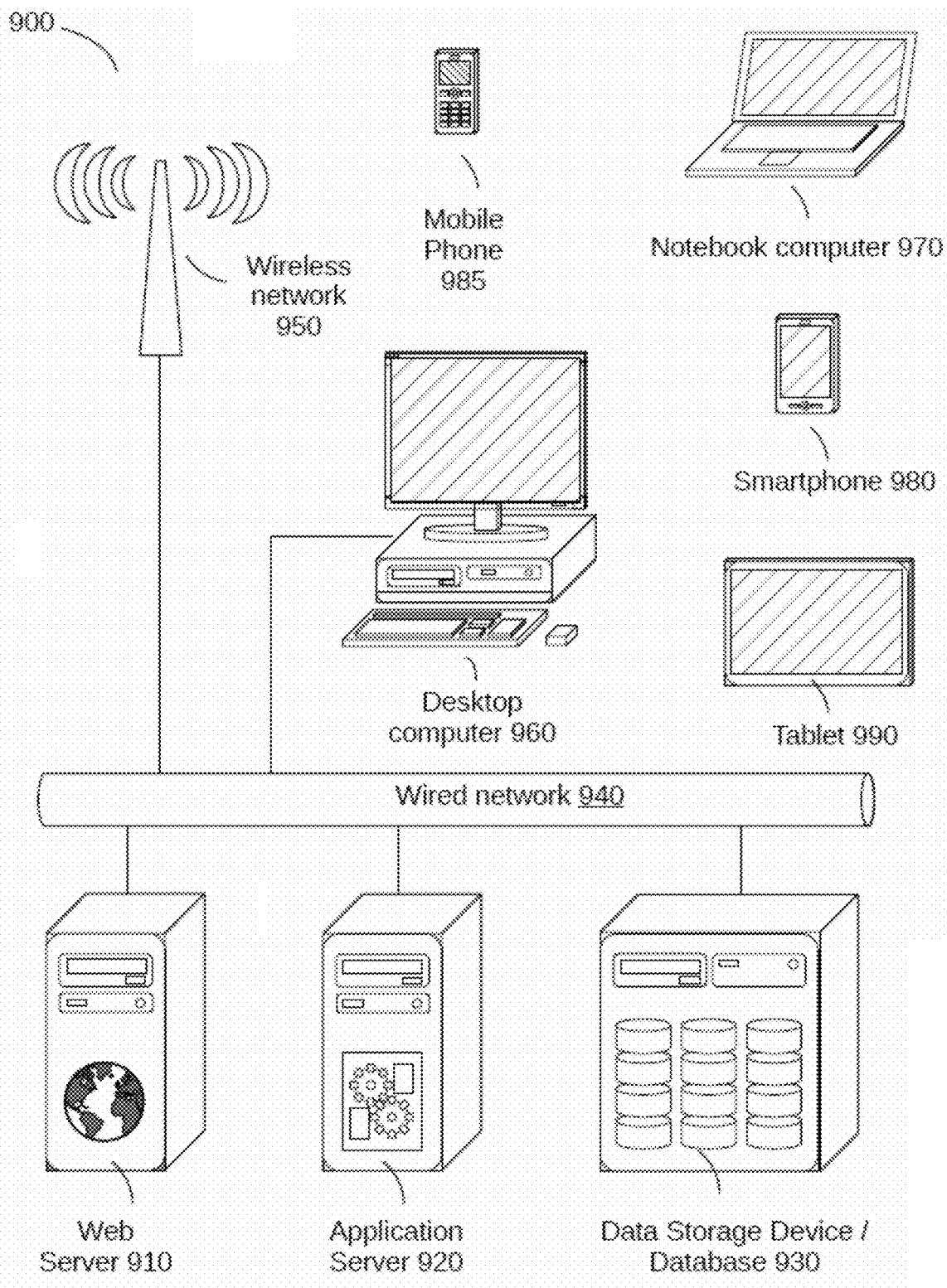
FIG. 6 is a general block diagram of a system and accompanying computing environment usable to implement the embodiments of FIGS. 1-5.

FIG. 6 is a general block diagram of a system 900 and accompanying computing environment usable to implement the embodiments of FIGS. 1-5. The example system 900 is capable of supporting or running various hardware and/or software modules and associated methods discussed with reference to FIGS. 1-5. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 6, the participant system(s) 12 (which may include developers, customer end users, etc.) of FIG. 1 may be implemented in whole or in part via one or more of the desktop computer 960, notebook computer 970, smartphone 980, mobile phone 985, tablet 990, of FIG. 6 and/or other computing devices.

In a particular example embodiment, the computing devices 960-990 run browsers, e.g., used to display the UI controls 30 of FIG. 1. Examples of UI display screens that may provide various UI controls and options, including the example UI controls 30 of the participant system(s) of FIG. 1, are shown in FIGS. 2 and 5.

In a particular example embodiment, browsers of the participant system(s) 12 of FIG. 1 connect to the Internet, represented by the wired network 940 and/or wireless network 950 as shown in FIG. 6, to thereby access one or more network-coupled servers, databases, and/or associated cloud-based functionality, as represented by the document cloud 16, the process cloud 18, and social network 14 (which may also be implemented as a cloud, e.g., a social network cloud) of FIG. 1.

Examples of document cloud functionality that may be accessed and used by the participant system(s) 12 of FIG. 1 include document management functionality 22 and associated folder structures and documents 24 managed thereby (including process cloud documents, application/project data, social network conversations 34 and associated documents and social objects).

Examples of process cloud functionality that may be accessed an used by the participant system(s) 12 and accompanying participants 44 of FIG. 1 include the process cloud services and development environments and applications, etc. 26, social network configured applications and associated processes and process flows 36, which may include specifications for manual tasks 38, i.e., tasks to be completed by a participant.

Similarly, examples of social network cloud functionality that may be accessed and used by the participant system(s) 12 of FIG. 1 include social network conversation functionality 40, including code 42 for creating conversations for each process-based application instance that is running on the process cloud 18.

Note that one or more of the web server 910, application server 920, and data storage device or database 930 shown in FIG. 6 may be used to host software corresponding to the modules 20-28, 32-42 of FIG. 1, as detailed more fully below.

In the particular example embodiment, the document management functionality of the process cloud functionality 22, process-based application development functionality 26, integration therebetween 20, DCS folder structures and documents 24, and business process management runtime 28, run in an integrated cloud computing environment that includes a collection of plural web servers 910, application servers 920, and data storage devices 930 shown in FIG. 6.

For example, in the particular example embodiment, process-based application development functionality 26 (e.g., PCS composer) of FIG. 1 runs on a process cloud 18 that communicates with a document cloud 16 via an integration mechanism 20, e.g., middleware, APIs, web services, etc. The document cloud 16 maintains the folder structures and documents 24 of FIG. 1 via data storage devices 930 of FIG. 6.

The process cloud 18 in combination with the document cloud 16 and social network 14 acts as an overall cloud that supports development, deployment, and use of conversation-enable process-based software applications 36 of FIG. 1.

Note that the runtime 28 of FIG. 1, which supports running of the process-based software applications 36, may run on one or more application servers 920, as shown in FIG. 6, and may use and access the folder structures and documents 24 of the document cloud 16. The folder structures and documents 24 of FIG. 1 may be maintained via one or more of the data storage devices 930 of FIG. 6.

In general, software developers e.g., users of the developer system(s) 14 of FIG. 1, may subscribe to certain cloud services to facilitate development of and use of software applications and storage of associated files. A cloud service that is configured for software application or process flow development and/or implementation is called a PCS herein.

A PCS may employ a networked database, e.g., the data storage device 930 of FIG. 6, to store files and other objects used by a given software program being developed. Recall that in various embodiments discussed herein, the data storage device(s) 930 of FIG. 6 also maintain the folder structures and documents 24 of the document cloud 16 of FIG. 1, which are usable by functionality 26, 28 of the process cloud 18 of FIG. 1.

In general, server-side development environments may be accessible to developers via browsers. The development environments may be backed by the PCS, such that certain developed software application files are stored in a PCS database corresponding to the one or more of the data storage devices 930 of FIG. 6.

A document cloud may include document management functionality (e.g., the document management functionality 22 of FIG. 1) in communication with folder structures and documents and may incorporate functionality for adding rich metadata documents and folders. The document management functionality may include MetaData Services (MDS) for characterizing folders and documents and associated structures with various types of metadata. The document management functionality may further include software (which may include a combination of webpage code from a web server 910 of FIG. 6 and supporting application code of an application server 920 of FIG. 6, where the webpage code may call the application code using web services, APIs, etc.) for generating one or more participant UI display screens, e.g., UI display screens and controls 30 presented via browsers of the participant systems 12 of FIG. 1.

In the particular example embodiment, the UI display screens and associated controls 30 of the participant systems 12 of FIG. 1 include accompanying UI controls and associated options. Example options include options to browse, create, delete, define, upload, download, etc., folders, structures, and documents, etc., as maintained via the folder structures and documents.

Note that in the particular example embodiment, browsers used by the participant system(s) 12 of FIG. 1, interface with web servers 910 shown in FIG. 6 to access websites and accompanying webpage code, which is backed by applications used to implement the modules 20-28, 32-42 of FIG. 1. The webpage code of the web servers 910 of FIG. 6 use web services, APIs, and/or other interfacing mechanisms to communicate with application software hosted on application servers 920 of FIG. 6 of the cloud, which includes a collection of web servers 910, application servers 920, and data storage devices 930 of FIG. 6.

Note that various embodiments discussed herein may provide substantial benefits in terms of providing efficiencies in systems and methods that achieve a new and useful end as it pertains to new software usability, collaboration functionality, and process metadata collection (e.g., metadata represented by conversations and accompanying messages associated with a process) and use. In particular, certain embodiments discussed herein uniquely leverage process cloud functionality and social network functionality (and may further leverage document cloud functionality) document management functionality and associated metadata tracking and handling mechanisms to facilitate process-based software application, development, implementation, use, and collaboration via a PCS.

Accordingly, various embodiments provide new capabilities for efficient software process collaboration and implementation, in part by uniquely leveraging integration between social network functionality 40 and process cloud functionality 26 and accompanying process-based software applications 36, as shown in FIG. 1.

Figure 7:
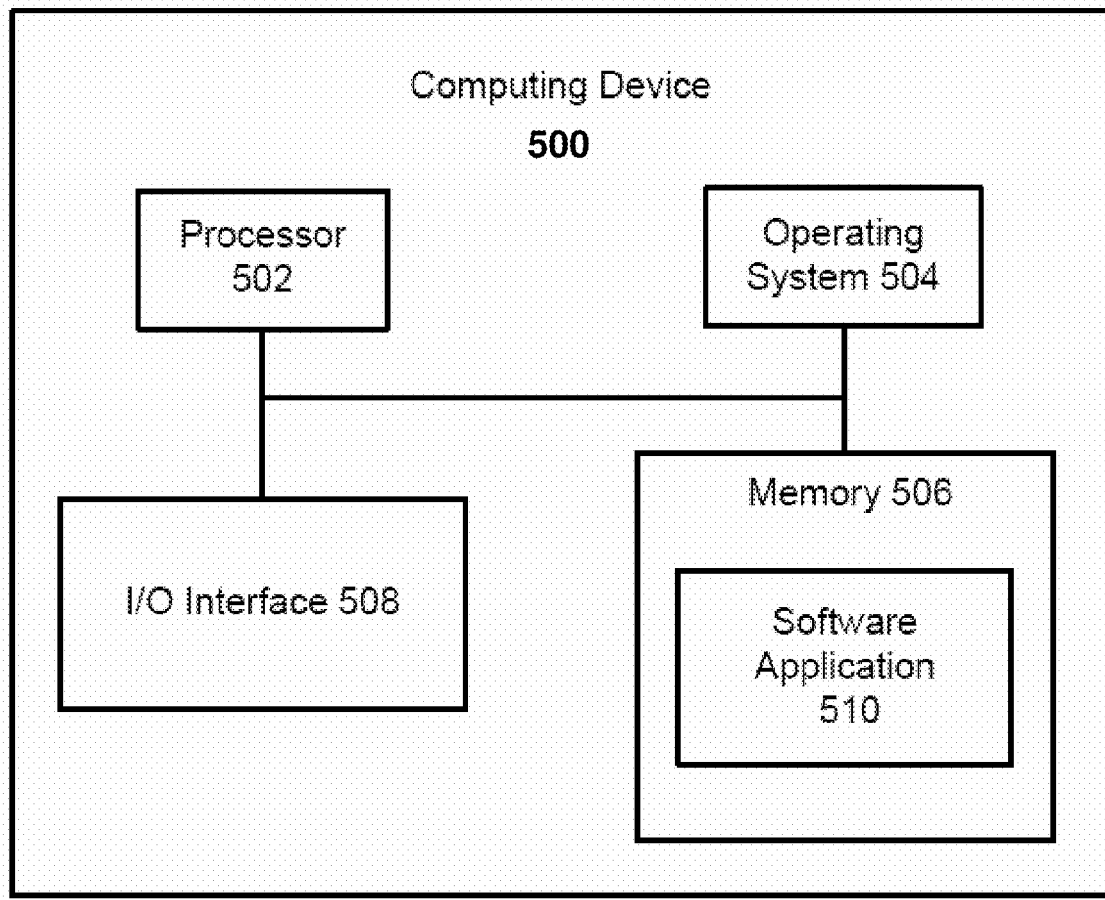
FIG. 7 is a general block diagram of a computing device usable to implement the embodiments of FIGS. 1-6.

FIG. 7 is a general block diagram of a computing device 500 usable to implement the embodiments described herein. While the computing device 500 of FIG. 7 may be described as performing one or more of the steps in the embodiments herein, in other embodiments any suitable component or combination of components of the computing device 500 or any suitable processor or processors associated with system 500 may facilitate performing the steps.

FIG. 7 illustrates a block diagram of an example computing system 500, which may be used for implementations described herein. For example, computing system 500 may be used to implement server devices 910, 920 of FIG. 6 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 7 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein involve integrating or leveraging functionality of a document services cloud for use by a process cloud, embodiments are not limited thereto. For example, a given process cloud may further leverage additional functionality of other clouds or systems in accordance with embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for:
    hosting, at a process cloud that comprises one or more computers, a software application that is configured for use with a social network,
    wherein the process cloud maintains documents for use with the software application, and with the social network via a social network application programming interface that processes communications between the social network and the process cloud, and receives input associated with conversations in the social network; and
    wherein the software application is defined by a process model having process elements spanning participants and activities involved in a process represented by the process model, and operates according to the process model to perform activities that execute as a process flow at the process cloud;
    receiving, via the social network application programming interface, a signal from the social network to run an instance of the software application at the process cloud and executing the process flow;
    creating a social network collaboration interface for the instance of the software application, and one or more social objects that implement the process flow for the instance, including:
        displaying, within the social network, a user interface associated with the software application, wherein each of the one or more social objects associated with the software application provides a mapping of data between the instance of the software application and process flow running at the process cloud and a conversation functionality provided by the social network, and
        wherein the software application being instantiated, one or more conversations for the software application instance and its social objects are created in accordance with rules of the software application, in the social network, together with a social object conversation identification that processes and tasks subsequently reference, wherein a social object and its contents are accessed via the user interface that displays a conversation with participants;
        wherein the rules specify, for particular tasks associated with the software application running at the process cloud, selected participants to be associated with the conversation;
    receiving, at the process cloud, input from the social network collaboration interface, in response to interaction by a participant with a particular social object of the one or more social objects, to control progression of the particular tasks associated with the software application;
    automatically determining, for the particular social object, in response to the interaction by the participant with the social object, the steps and tasks and participants associated with a particular conversation using the social object, and with additional conversations managed by the social object and including a subset of participants based on a particular task, which subset of participants is automatically determined based on the particular conversation and particular task; and
    communicating, by the process cloud, with a document cloud, to access and update the documents associated with the social object during execution of the software application, via interaction with the social network, including for the particular conversation the documents maintained at the document cloud as part of the particular conversation.

2. The non-transitory computer readable medium of claim 1, wherein creating a social network collaboration interface further includes creating an intra-task level collaboration interface.

3. The non-transitory computer readable medium of claim 2, wherein the intra-task level collaboration interface represents a closed forum involving an exchange of communications between one or more participants, the intra-task level collaboration interface occurring between adjacent tasks or processes of the software application.

4. The non-transitory computer readable medium of claim 3, further including automatically determining participants of the closed form based on a software task that has been completed or a software task that is to be completed, in combination with metadata characterizing the one or more participants, including at least one of a role and a security credential associated with each of the one or more participants.

5. The non-transitory computer readable medium of claim 1, wherein creating a social network collaboration interface further includes creating an inter-task level collaboration interface occurring during running of a given software task.

6. The non-transitory computer readable medium of claim 5, wherein the inter-task level collaboration interface involves a subset of the participants that have been selected for participation in multiple collaborative tasks to be implemented via the software application.

7. The non-transitory computer readable medium of claim 1, further including determining the participants, such that an application-level collaboration interface will include participants that have been invited to the collaboration interface in accordance with one or more rules specified via the software application.

8. The non-transitory computer readable medium of claim 7, further including selectively adjusting the participants by omitting or including participants based on a particular task being implemented via the software application.

9. The non-transitory computer readable medium of claim 1, wherein the process cloud is integrated with the document cloud via an application programming interface (API) or service for integrating document management functionality of the document cloud; process cloud functionality; and software applications of the process cloud, with social network functionality of the social network.

10. The non-transitory computer readable medium of claim 9, wherein the API includes computer code for processing communications between the social network and the process cloud functionality, wherein the communications include at least one of a signal from the process cloud to the social network to start a social network conversation for a particular social-network configured application, or a signal from the social network to the process cloud to activate and run one or more social-network configured applications.

11. The non-transitory computer readable medium of claim 1, wherein upon creation of a social object for an instance of the software application and associated process flow, its social object conversation identification is stored for subsequent reference in the process flow;
  wherein the mapping of data provided by the social object includes attributes stored as social object parameters characterizing the social object;
  wherein to provide cross-correlation the social object attributes are updated with corresponding identifications of associated process-based software applications and objects at the process cloud.

12. A method for facilitating collaborative participation in a software application, the method comprising:
  hosting, at a process cloud that comprises one or more computers, a software application that is configured for use with a social network,
    wherein the process cloud maintains documents for use with the software application, and with the social network via a social network application programming interface that processes communications between the social network and the process cloud, and receives input associated with conversations in the social network; and
    wherein the software application is defined by a process model having process elements spanning participants and activities involved in a process represented by the process model, and operates according to the process model to perform activities that execute as a process flow at the process cloud;
  receiving, via the social network application programming interface, a signal from the social network to run an instance of the software application at the process cloud and executing the process flow;
  creating a social network collaboration interface for the instance of the software application, and one or more social objects that implement the process flow for the instance, including:
    displaying, within the social network, a user interface associated with the software application, wherein each of the one or more social objects associated with the software application provides a mapping of data between the instance of the software application and process flow running at the process cloud and a conversation functionality provided by the social network, and
    wherein the software application being instantiated, one or more conversations for the software application instance and its social objects are created in accordance with rules of the software application, in the social network, together with a social object conversation identification that processes and tasks subsequently reference, wherein a social object and its contents are accessed via the user interface that displays a conversation with participants;
    wherein the rules specify, for particular tasks associated with the software application running at the process cloud, selected participants to be associated with the conversation;
  receiving, at the process cloud, input from the social network collaboration interface, in response to interaction by a participant with a particular social object of the one or more social objects, to control progression of the particular tasks associated with the software application;
  automatically determining, for the particular social object, in response to the interaction by the participant with the social object, the steps and tasks and participants associated with a particular conversation using the social object, and with additional conversations managed by the social object and including a subset of participants based on a particular task, which subset of participants is automatically determined based on the particular conversation and particular task; and
  communicating, by the process cloud, with a document cloud, to access and update the documents associated with the social object during execution of the software application, via interaction with the social network, including for the particular conversation the documents maintained at the document cloud as part of the particular conversation.

13. The method of claim 12, wherein creating a social network collaboration interface further includes creating an intra-task level collaboration interface.

14. The method of claim 13, wherein the intra-task level collaboration interface represents a closed forum involving an exchange of communications between one or more participants, the intra-task level collaboration interface occurring between adjacent tasks or processes of the software application.

15. The method of claim 14, further including automatically determining participants of the closed form based on a software task that has been completed or a software task that is to be completed, in combination with metadata characterizing the one or more participants, including at least one of a role and a security credential associated with each of the one or more participants.

16. The method of claim 12, wherein creating a social network collaboration interface further includes creating an inter-task level collaboration interface occurring during running of a given software task.

17. The method of claim 16, wherein the inter-task level collaboration interface involves a subset of the participants that have been selected for participation in multiple collaborative tasks to be implemented via the software application.

18. The method of claim 12, further including determining the participants, such that an application-level collaboration interface will include participants that have been invited to the collaboration interface in accordance with one or more rules specified via the software application.

19. The method of claim 12, wherein the process cloud is integrated with the document cloud via an application programming interface (API) or service for integrating document management functionality of the document cloud; process cloud functionality; and software applications of the process cloud, with social network functionality of the social network.

20. The method of claim 12, wherein upon creation of a social object for an instance of the software application and associated process flow, its social object conversation identification is stored for subsequent reference in the process flow;
   wherein the mapping of data provided by the social object includes attributes stored as social object parameters characterizing the social object;
   wherein to provide cross-correlation the social object attributes are updated with corresponding identifications of associated process-based software applications and objects at the process cloud.

21. An apparatus for facilitating collaborative participation in a software application, the apparatus comprising:
   one or more processors;
   a non-transitory processor-readable storage device including instructions for:
   hosting, at a process cloud that comprises one or more computers, a software application that is configured for use with a social network,
   wherein the process cloud maintains documents for use with the software application, and with the social network via a social network application programming interface that processes communications between the social network and the process cloud, and receives input associated with conversations in the social network; and
   wherein the software application is defined by a process model having process elements spanning participants and activities involved in a process represented by the process model, and operates according to the process model to perform activities that execute as a process flow at the process cloud;
   receiving, via the social network application programming interface, a signal from the social network to run an instance of the software application at the process cloud and executing the process flow;
   creating a social network collaboration interface for the instance of the software application, and one or more social objects that implement the process flow for the instance, including:
      displaying, within the social network, a user interface associated with the software application, wherein each of the one or more social objects associated with the software application provides a mapping of data between the instance of the software application and process flow running at the process cloud and a conversation functionality provided by the social network, and
      wherein the software application being instantiated, one or more conversations for the software application instance and its social objects are created in accordance with rules of the software application, in the social network, together with a social object conversation identification that processes and tasks subsequently reference, wherein a social object and its contents are accessed via the user interface that displays a conversation with participants;
      wherein the rules specify, for particular tasks associated with the software application running at the process cloud, selected participants to be associated with the conversation;
   receiving, at the process cloud, input from the social network collaboration interface, in response to interaction by a participant with a particular social object of the one or more social objects, to control progression of the particular tasks associated with the software application;
   automatically determining, for the particular social object, in response to the interaction by the participant with the social object, the steps and tasks and participants associated with a particular conversation using the social object, and with additional conversations managed by the social object and including a subset of participants based on a particular task, which subset of participants is automatically determined based on the particular conversation and particular task; and
   communicating, by the process cloud, with a document cloud, to access and update the documents associated with the social object during execution of the software application, via interaction with the social network, including for the particular conversation the documents maintained at the document cloud as part of the particular conversation.

22. The apparatus of claim 21,
   wherein the process cloud includes a process management runtime engine that runs software applications and accompanying process flows, including wherein social network conversations that are instantiated are used by processes hosted and run by the process management runtime engine;
   wherein the process cloud is integrated with the document cloud via an integration module providing an application programming interface (API) or service for integrating document management functionality of the document cloud; process cloud functionality; and software applications of the process cloud, with social network functionality of the social network; and
   wherein at least one of the API provided in the integration module includes a social network API that processes communications between the social network and the process cloud functionality, and is adapted to:
      receive signals from the process cloud to the social network to start a given social network conversation for a particular social-network configured application, and
      receive signals from the social network to the process cloud to activate and run one or more social-network configured applications.

* * * * *